United States Patent [19]

Fuqua et al.

[11] 3,840,863

[45] Oct. 8, 1974

[54] DYNAMIC STORAGE HIERARCHY SYSTEM

[75] Inventors: Robert Randolph Fuqua, Underhill; Gerold Bernhard Hasler, Burlington, both of Vt.

[73] Assignee: International Business Machines Corporation, Armonk, N.Y.

[22] Filed: Oct. 23, 1973

[21] Appl. No.: 408,958

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,569,938 | 3/1971 | Eden et al. | 340/172.5 |
| 3,675,215 | 7/1972 | Arnold et al. | 340/172.5 |
| 3,693,165 | 9/1972 | Reiley et al. | 340/172.5 |
| 3,699,533 | 10/1972 | Hunter | 340/172.5 |
| 3,729,712 | 4/1973 | Glassman | 340/172.5 |

*Primary Examiner*—Harvey E. Springborn
*Attorney, Agent, or Firm*—Howard J. Walter, Jr.

[57] ABSTRACT

A data processing system having a main storage-buffer memory hierarchy in which various congruence mapping class configurations are dynamically provided by utilizing a fixed format main storage-buffer array unit. A directory is provided which generates buffer slot addresses in response to the class address portion of a main storage address word. Various block sizes of data may be associatively mapped into predefined areas of a buffer array. A single integrated circuit chip containing both main memory and buffer arrays may be used to implement various congruence classes by the selective application of input signals provided by the main storage address and a hierarchy directory.

7 Claims, 6 Drawing Figures

DYNAMIC STORAGE HIERARCHY SYSTEM

BACKGROUND OF THE INVENTION

1. Field of the Invention

This invention relates to data processing systems having a memory hierarchy including a high speed buffer store and more particularly to a data storage system having a reconfigurable hierarchy.

2. Description of the Prior Art:

A data processing system generally comprises a main memory or main storage for holding data and instructions to be acted upon by a central processing unit (CPU). The CPU is generally composed of circuits that operate at a high speed while the main memory is generally composed of devices that operate at a lower speed. The system performance is greatly determined by the slow speeds at which the memory can be accessed. The gap between the circuit speed of the CPU and the memory access time has been accentuated by the trend to make computers faster in operation and larger in storage capacity.

The purpose of a storage system is to hold information and to associate the information with a logical address space known to the remainder of the computer system. For example, the CPU may present a logical address to the storage system with instructions to either retrieve or modify the information associated with that address. If the storage system consists of a single device, then the logical address space corresponds directly to the physical address space of the device. Alternately, a storage system with the same address space can be realized by a hierarchy of storage devices including a fast, but expensive, buffer memory and a slow but relatively inexpensive main memory. In such storage hierarchies, the logical address space is often partitioned into equal size units that represent the blocks of information capable of being moved between adjacent devices in the hierarchy.

A hierarchy management facility is intended to control the movement of blocks and to effect the association between the logical address space and the physical address space of the hierarchy. When the CPU references a logical address, the hierarchy management facility first determines the physical location of the corresponding logical block in main storage and may then move the block to a fast storage device or buffer where the reference is effected. Since these actions are transparent to the remainder of the computer system, the logical operation of the hierarchy is indistinguishable from that of a single-device system.

The goal of the hierarchy management facility is to maximize the number of times that logical information is contained in the buffer when being referenced. As this goal is approached, most references to storage are directed to the faster buffer memory while the logical address space remains distributed over the slower main memory. The net effect is that the system acquires the approximate speed of the buffer storage while maintaining an approximate cost-per-bit of the slower and less expensive main storage device.

In a two level storage hierarchy, main storage and buffer storage are logically divided into blocks of data. Block size depends upon the system performance requirements, the main storage capacity, and the physical configuration constraints of the system. A block is the unit of data transferred between one storage level and its nearest neighbor. Optimum block size may vary from system to system or application to application. Since the buffer cannot contain all the information in main storage, circuitry normally referred to as the directory is provided. The directory is comprised of an address array, a replacement array and control circuitry. The address array determines whether or not the addressed data is located in the buffer. The replacement array records and executes the buffer replacement algorithm which determines which blocks of data in the buffer should be replaced when new information is required to be placed in the buffer and a block must be returned to main storage. The directory is implemented entirely by hardware and is transparent to the system user. Techniques for choosing a particular block size and replacement algorithm are described in "A Study of Replacement Algorithms for a Virtual-Storage Computer." L. A. Belady, IBM Systems Journal, Vol. 5, No. 2, pp. 78–101 (1966).

There are two general schemes used for mapping the main storage space into the buffer. They are associative, or unconstrained mapping and partial associative or unconstrained mapping. In the associative mapping scheme, any block in main storage can map into any block frame or slot in the buffer. The advantages of associative mapping are that all available block frames in the buffer can be used, and also that seldom used blocks cannot become locked into the buffer by mapping constraints. The disadvantage of associative mapping is that extensive associative searches may be necessary to locate blocks in the buffer. Moreover, the implementation of overhead of the replacement algorithm may be excessive, since relative priority information must be maintained for all blocks in the buffer. In the partial associative mapping scheme, main storage is divided into classes and books. A class is an addressable subdivision of both main and buffer storage. A class in main storage contains X number of blocks and in buffer storage N number of blocks, where N is considerably smaller than X. All blocks in a given class within the main storage compete for residence in the limited number of blocks in the buffer within a particular class. A book is equal to the row partitioning of main storage. The total number of book addresses is the same for each class in main storage. A book contains as many blocks as there are classes, hence book capacity in words is the product of the number of classes times the block size.

The row partitioning of buffer storage is called a slot. A buffer containing N slots is also said to have N way associativity.

For further more detailed description of storage hierarchy techniques reference is made to the article "Evaluation Techniques for Storage Hierarchies," R. L. Mattson et al., IBM Systems Journal, Vol. 9, No. 2, pp. 78–117 (1970).

An example of a computer hierarchy system using a single unconstrained class is the IBM S/360 Model 85. A description of the storage hierarchy of this system is described in the IBM Systems Journal, Vol. 7, No. 1, 1968 beginning at page 2. An example of a system using multiple classes is the IBM S/360, Model 168, which partitions main memory and buffer into 64 separate classes. The following documents describe various aspects of the Model 168: "A Guide to the IBM S/370, Model 168," IBM Corp., Document No. GC 20-1775 (1973) and "System/370 Model 168 Theory of Operation/Diagrams Manual," Vols. 1–4, IBM Corp. Document Nos. SY22–6931–4, herein incorporated by reference.

Additional descriptions of typical prior art memory hierarchies using buffer storage are disclosed in U.S. Pat. Nos. 3,248,702, Kilburn et al. and 3,588,829, Boland et al., both assigned to the assignee of the present application.

Traditionally, prior arc memory hierarchy systems have been designed at the computer systems level and specific hardware components of memory hierarchies have been physically designed to operate in a fixed hierarchy organization. That is, entire computer systems have been optimally designed to include only a single particular form of constrained main storage to buffer mapping. Because main storage, initially magnetic core memory units and presently integrated circuit semiconductor memories, is an integral and separately manufactured component from that of the buffer memory, variations in the actual physical interconnections between main storage components and buffer storage components are selectively provided at the system assembly level.

With increases in the sophistication of integrated circuit manufacturing techniques, it is now possible to integrate into a single fixed design component, or field replaceable unit, (board, card, module or ultimately a single integrated circuit chip) the entire memory hierarchy system.

Although the ability to place both main memory and buffer in the same physical component allows reduction in manufacturing cost and increases in performances, each different hierarchy configuration requires separately designed components as the actual interconnections between main memory and buffer are different for each hierarchy configuration.

SUMMARY OF THE INVENTION

It is therefore an object of this invention to reduce the manufacturing costs of integrated memory hierarchy components by providing a single component useful for multiple applications.

It is another object of this invention to provide a hierarchical memory system capable of being reconfigured to meet various computer system needs.

It is yet another object to provide a memory hierarchy capable of dynamic reconfiguration within a given computer system to improve overall system performance.

The instant invention accomplishes the above objects by providing a novel fixed relationship between main storage and buffer memories which is capable of providing transfer of various size blocks of data between main storage and the buffer, as well as selectively providing various constrained mapping configurations of data within a variable number of addressable classes. A two level main storage-buffer hierarchy is provided in a fixed physical format and includes means for decoding and transferring blocks of main storage data to associated blocks of the buffer independent of the particular address word format. A directory is provided which generates buffer slot addresses in direct response to the congruence class and book portion of the main storage address word. The fixed format hardware is designed initially for the maximum flexibility required by various applications and is thereafter initialized by selectively programming the directory either permanently or with logic to provide either a fixed hierarchy configuration or a dynamic configuration.

The foregoing and other objects, features, and advantages of the invention will be apparent from the following more particular description of the preferred embodiments of the invention, as illustrated in the accompanying drawings.

Figure 1:
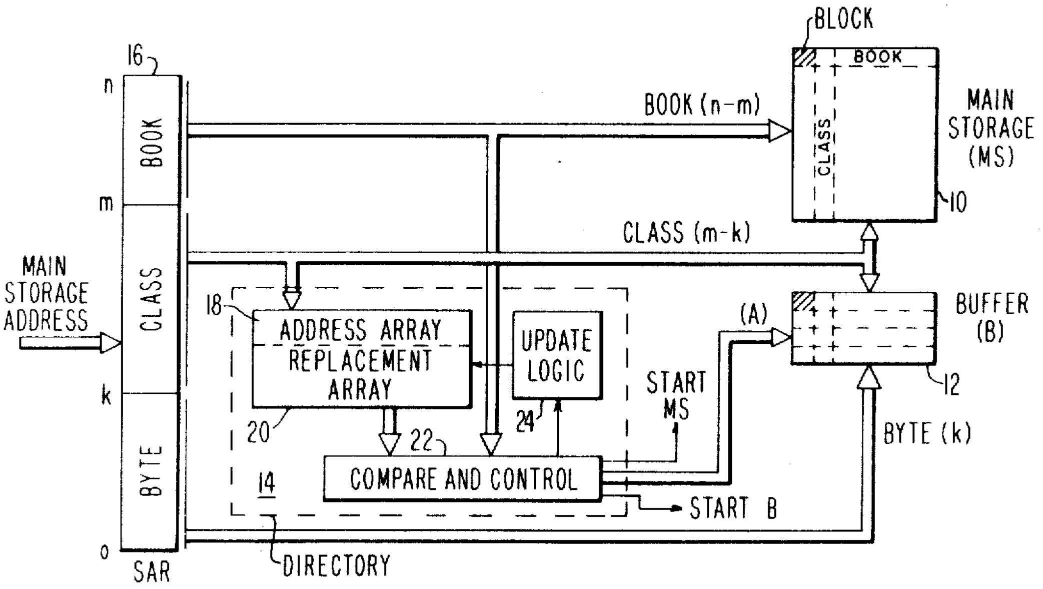
FIG. 1 (PRIOR ART)
FIG. 1 is a schematic block diagram of a typical memory hierarchy system found in the prior art.

DESCRIPTION OF THE PREFERRED EMBODIMENTS:

A two level prior art memory hierarchy system and directory are shown in FIG. 1 comprised of main storage 10, buffer storage 12, hierarchy directory 14, and storage address register (SAR) 16. SAR 16 is provided with n address bits which describe a $2^n$ Byte main storage space. Main storage space is divided into $2^{n-m}$ books, $2^{m-k}$classes, and a $2^k$byte block size. Any byte within this main storage address space may be addressed by the n bits of SAR 16. Buffer 12, as shown, is implemented with four way associativity, that is the buffer has four slots. The four slot addresses A are provided by directory 14.

The directory monitors and directs all store and fetch requests made by the CPU via the storage control unit (SCU), not shown, to the proper destination. Directory 14 is comprised of an address array 18 and a replacement array 20. Address array 18 contains the main storage address of each block currently residing in buffer 12. Whenever main storage 10 is referenced, its storage address is compared with the contents of the directory. A replacement array 20 records the frequency of data references of the various blocks in the buffer, and is implemented in a Last Recently Used (LRU), First-In-First-Out (FIFO) or other replacement algorithm. Replacement array 20 may also contain a Stored In Status (SIS) bit which indicates whether a store operation from the SCU has modified the block or parts of it in the buffer, causing the data in the lower levels of the hierarchy to become invalid. The address and replacement array have $(m-k)$ entries, as many entries as there are congruence of classes. Additional logic is provided for comparing, controlling and updating arrays 18 and 20 as represented by functional units 22 and 24.

The number of bits required to implement the address array depends upon the number of congruence classes C, the buffer associativity A, and the number of address bits required to describe the book address $(n-m)$. Thus, the address array capacity for a particular hierarchy configuration equals CA $(n-m)$ bits. Likewise, the number of bits required to implement the replacement array is a function of the buffer associativity A, the number of bits representing the replacement algorithm REP, the number of congruence classes C, and the number of additional control bits B required per block. The total replacement array capacity is therefore equal to the quantity C(REP(A) + BA) bits.

Various hierarchy directory designs may be implemented as described in the previously referenced documents which provide detailed descriptions of both the specific functions and logic circuits necessary to implement these prior art designs. Hierarchy systems may be optimized for minimum hardware, hence, minimum cost, best performance or high reliability and availability. In addition, associative arrays also represent a suitable technology to implement the address array. The search argument in an associative address array represents the book address, the data output provides a matched signal and the appropriate buffer slot address whenever the search argument has been located in the associative array.

Figure 2A:
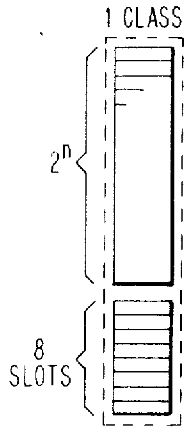
FIGS. 2A through 2C are pictorial representations of the congruence mapping concept illustrating the partitioning of main storage and buffer memory storage space into independent congruence classes.
Figure 2B:
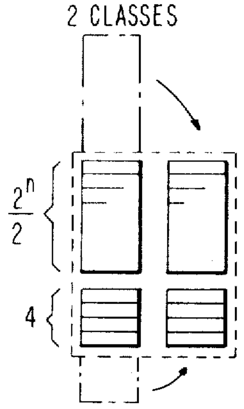
Figure 2C:
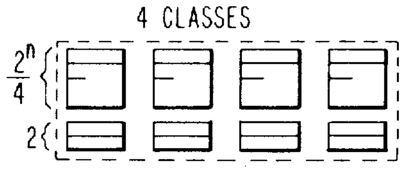

Referring briefly to FIGS. 2A–2C there is shown schematically how a main storage unit containing $2^n$ addressable units may be partitioned into congruence classes using a buffer having eight slots or eight way associativity. FIG. 2A represents a single class heirarchy where each of the $2^n$ transferable units in main storage may be placed in any of the eight slots in the buffer. FIG. 2B represents a two class system in which the first $(2^n)/2$ addressable units in main storage may be placed only in the first four slots of the buffer and the second $(2^n)/2$ addressable units may be placed only in the second four slots of the buffer. FIG. 2C represents a system containing four classes in which main storage is divided into units of $(2^n)/4$ which are limited by the system to be placed in only two slots of the buffer.

As previously described, data communications between buffer and main storage in prior art systems is performed through cables. The buffer is packaged on a board and is physically separated from main storage. The buffer is usually located in a storage control unit, which also contains the channel hardware, the address translation units and the hierarchy directory. Because of cabling limitations, sequential transfers are required between main storage and buffer to achieve the desired block size. Advances in large scale integration technology have made it possible to integrate high performance buffer storage cells and low performance high density main memory cells into the same package or the same semiconductor chip. Main storage array is buffered by registers or high speed arrays provide the improved average performance. Large block transfers, approaching virtual storage page sizes, can easily be achieved by integration. The block transfer time between the two levels becomes equal to the main storage array cycle time.

Figure 3:
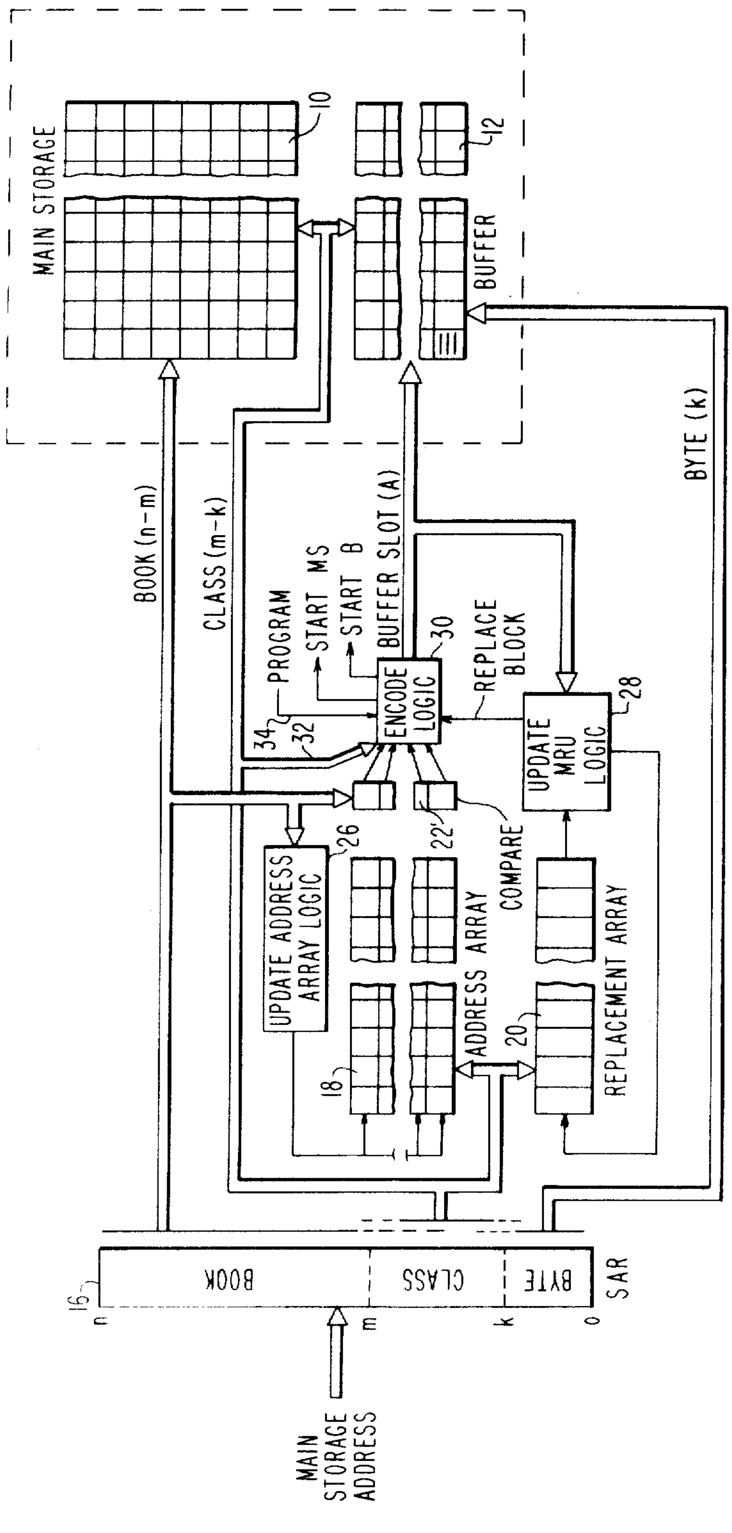
FIG. 3 is a partial schematic block diagram of an embodiment of the instant invention implemented using conventional directory concepts.

Referring now to FIG. 3 there is shown a preferred embodiment of the instant invention which includes the advantageous use of a fixed format main storage and buffer combination made possible by recent large scale integration techniques. Functionally equivalent items in FIG. 3 utilize the same reference characters as used in describing the system of FIG. 1.

FIG. 3 illustrates the system organization concepts necessary to implement a dynamically reconfiguraable storage hierarchy according to the invention. Most of the individual elements making up components of the system are similar in function and designed to those of the conventional hierarchy described previously in connection with FIG. 1. These functionally equivalent units include main storage 10, buffer 12, storage address register 16, address array 18, replacement array 20, compare circuit 22', update address array logic 26 and update MRU logic 28. It will be recognized by those skilled in the art that the function of the directory in determining whether or not a particular address has been stored in the buffer is independent of the particular configuration of the hierarchy as all of the book and class addresses are considered as a single identifying characteristic. Thus, it is necessary to provide an input to the address and replacement arrays for both the book and class addresses.

In order to enable the hierarchy to be dynamically reconfigured, it will be apparent to those skilled in the art that the values of $n$, $m$, and $k$ must be variable and the directory must be designed such that it can accommodate any of the desired hierarchy configurations. The address array 18 and replacement array 20 must have $(m-k)$ entries, as many entries as there are classes.

The address array, its associated compare and encoding circuitry are designed as follows. First, determine for the overall possible configurations the maximum n-m value. Second, determine the maximum desirable associativity A. Then the address array directory word length and the number of compare circuits becomes $A_{MAX}$ times $(n-m)_{MAX}$ bits. If, for example, the buffer is designed with a smaller associativity A, then some additional class address bits $(m-k)$ are utilized to degate, or disable the appropriate compare circuits in the encoder logic unit 30 by applying the appropriate class address bits to the unit through bus 32 in order to enable the appropriate address lines A for buffer 12.

The following example illustrates the design of a directory for a two megabyte main storage and a 32k byte buffer with the following four different buffer organizations:

| | | | | | |
|---|---|---|---|---|---|
| Book | $(2^{n-m})$ | 64 | 64 | 64 | 64 |
| Class | $(2^{m-k})$ | 64 | 16 | 128 | 64 |
| Byte | ($2^k$bytes) | 32 | 128 | 64 | 128 |
| Associativity | $(2^A)$ | 16 | 16 | 4 | 4 |

In this case, the book address $(n-m)$ requires 6 book bits which are constant. The maximum associativity $2^A$ equals 16 and the address array directory word length equals $A_{MAX}(n-m)_{MAX}$= 24 bits. Hence it is necessary that the address array be organized as 64 words by 24 bits. Also note that the smaller the block size the greater the address array capacity requirement. A system using a fixed number of blocks, does not require anymore address array bits than a conventional directory without dynamic hierarchy parameter allocation. The only additional circuitry required is in the compare, encode units and the replacement array size which mainly depends on the LRU algorithm.

Referring again to FIG. 3, consider a hierarchy system including two congruence classes implemented in a system initially designed to have a minimum of one class and a maximum of 16 buffer slots. Within the altered hierarchy configuration the buffer will then consist of eight effective slots for each class. Since address array comparison is made on a word basis a compare output from the address array utilizing only the first eight slots of the buffer cannot distinguish in which of the classes in the buffer the information is located. In order to provide selective addressing of any of the 16 slots physically present in the buffer, enable logic unit 30 is responsive to the class bits ($m-k$), in this case one bit, which is applied to enable logic unit 30 to override the normally generated slot address to provide, for example, the high order address bit of A independent of the normally generated address bit determined from a compare unit 24.

Those skilled in the art will recognize that various configurations may be utilized in order to generate the appropriate number of buffer slot address bits in response to the system class address. Further specific details of typical circuits are contained in the previously referred to documents.

It will also be rocognized that additional functional forms of the directory may be provided such as the use of an associative directory wherein the entire buffer address is generated directly from a fully associative address and replacement array. An associative array is independent of the number of classes and the associativity. It is simply a function of the number of entries A times ($m$-$k$) and the entry size ($n$-$m$).

It will also be apparent that the system designer may choose to provide CPU responsive logic in order to dynamically control the configuration of the memory hierarchy during computer system operation as opposed to physically fixing the configuration by selective wiring of the class address bits. Implementation of such logic will be obviously apparent to those skilled in the art. Such a dynamic control may be initiated through the use of a program control input 34 to encode logic unit 30.

Figure 4:
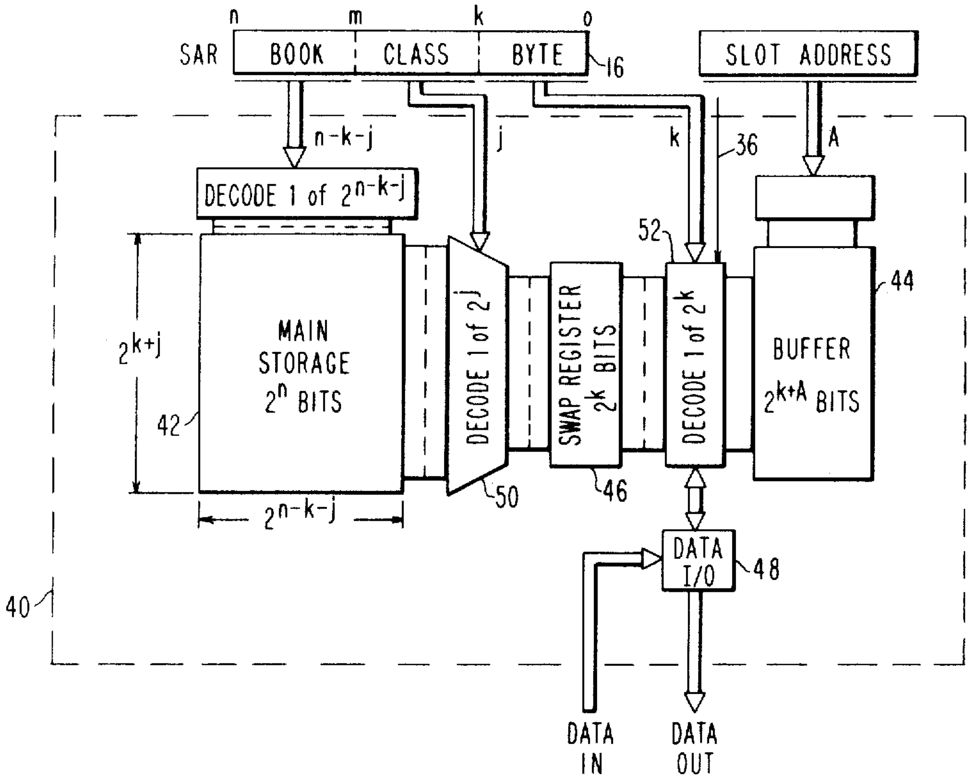
FIG. 4 is a block diagram of a preferred embodiment of the invention in which the fixed format between the main storage and buffer is shown for various hierarchy configurations.

Referring to FIG. 4, there is shown a block diagram of the main storage-buffer portion of the hierarchy showing the fixed physical interconnection network in order to enable the manufacture this portion of the memory as a single discrete unit 40. Unit 40 may be an integrated circuit chip, a module, or a card. An important aspect of unit 40 is that it is capable of the manufacture as a single part number and may be utilized in computer systems requiring various heirarchy configurations. Main storage array 10 is comprised of relatively low performance high density one-device storage cells such as described in commonly assigned U.S. Pat. No. 3,387,286 to Dennard. The buffer 12 is comprised of high performance four-device or six-device storage cells such as described in U.S. Pat. No. 3,541,530 to Spampinato et al. and U.S. Pat. No. 3,588,846 to Linton et al., respectively. A functional hierarchy-on-chip (HOC) with a $2^n$ bit main storage array and a $2^{k+A}$ bit buffer array is shown in FIG. 4. Storage address register 16, located off chip, contains the main storage address bit designations ($n-m$) for book addresses, $m-k$ for class addresses and $k$ for bit addresses within a block.

Main storage 10 is organized as an array with $2^{n-k-j}$ word lines and $2^{n+j}$ bit lines. The $2^{k+j}$ bit lines from main storage are decoded down to $2^k$ bits which are connectable to the buffer array 44, the swap register 46, or the data in/data out interface 48. Buffer array 44 is organized as $2^A$ word lines by $2^k$ bit lines. Each of the $2^A$ word lines potentially represents one buffer slot. Each word line and bit line can be uniquely selected by the decoders, allowing one bit to be read or written. Eight identical units or chips 40 addressed in parallel make up a $2^n$-byte two-level main storage hierarchy.

A total of n+A address lines are required to operate the hierarchy-on-chip of FIG. 4. The ($n-k-j$) addresses decode one out of the $2^{n-k-j}$ word lines in main storage array 42. As shown, $j$ of the book-class address lines are connected to a decoder 50 which selects one of the $2^j$ possible combinations. The $k$ bit block address lines decode one of $2^k$ buffer bit lines and the A buffer slot address lines connected to the directory select one of the $2^A$ buffer word lines. Either the data in or data out circuit may be connected to one of the $2^k$ bit lines through a $2^k$ bit decoder 52. The same decoder is used to connect the data lines to a buffer or main storage cell to perform a one bit read or write operation.

Various storage space, or class, configurations for the hierarchy-on-chip are represented. Chip 40 can be operated as a $2^A$, $2^{A-1}$, . . . or one way associative hierarchy. All of these configurations have a $2^k$ bit block size indicating the total number of lines between main storage and the buffer. Consider first the one class configuration. A $2^k$ bit group of data can be transferred into nay one of the $2^A$ buffer slots. The $2^k$ bit group can originate from any one of the $2^{n-k-j}$ word lines and any one-quarter of the $2^{k+j}$ bit lines in main storage 42 therefore originating in any one of the $2^{n-k}$ books in the one class configuration. All n+A address bits are required for the one class configuration. Two class configuration provides a $2^{A-1}$ way associativity. The capacity of the buffer is constant at $2^{k+A}$ bits. The mapping of the $2^{n-k}$ books is now constrained in the following manner.

A total of $2^{n-m}$ books are mapped into the first half of the buffer array 44, and the remaining $2^{n-m}$ books mapped into the second half of the buffer array. As an example, the two classes in main storage array 42 represent the upper and lower half of the word lines, decoded by one of the address bits of decoder 50. The upper half of the word lines in main storage 42 always transfer into the left half of the buffer array 44 and the lower half of the word lines in main storage 42 always transfer to the right half of the buffer array 44. The two class configuration requires a storage address word of $n+A-1$ bits. One of the A buffer word line address bits is common with one of the address bits decoding the upper or lower half of the main storage array, that is, the class address contained in SAR 16. Accordingly, $n+A-2$ address bits are required for the four class configuration.

The following example of a specific implementation will more clearly illustrate the dynamic hierarchy concept of the invention.

Consider, for example, a main storage array of 32k bits and a buffer of 512 bits. The main storage address presented to the storage address register requires a total of $n$=18 bits, where 6 bits are common to the main storage and the buffer. That is, $k$=6. The maximum associativity of the buffer is 8 requiring that the buffer slot address A=3 bits. A one class configuration contains eight slots (associativities) and 512 books, representing a general case. The following table illustrates that with a single part number four different configurations may be obtained.

TABLE

| Classes | Bit Transfer | Associativity | Books | Configuration |
|---|---|---|---|---|
| 1 | 64 | 8 | 512 | 1 |
| 2 | 64 | 4 | 256 | 2 |
| 4 | 64 | 2 | 128 | 3 |
| 8 | 64 | 1 | 64 | 4 |

These four configurations can be related to the book, congruence class, and byte addresses. The following Table illustrates how the address bits at the chip level are associated with the various configurations.

TABLE

| Configuration No. | 1 | 2 | 3 | 4 |
|---|---|---|---|---|
| Book (n-m) | 9 | 8 | 7 | 6 |
| Congruence Class (m-k) | 0 | 1 | 2 | 3 |
| Byte (k) | 6 | 6 | 6 | 6 |
| Associativity (A) | 3 | 2 | 1 | 0 |
| Total Chip Address Bits Required | 18 | 17 | 16 | 15 |

In these configurations a seven word decode ($n$—$k$—2) and the two decode bits to decoder 50 provide the book and congruence class address, a total of nine bits. It will be noticed that all configurations except No. 1 have more address inputs than necessary. For example, configuration 3, a four class configuration, requires only 16 of the 18 available address bits. Therefore, two address inputs can be dotted, connected in common, with two of the 16 required paths. However, to allow for dynamic reconfiguration, the adresses are combined and controlled at the directory as previously described.

Those skilled in the art will recognize that various permutations of the above described example may be achieved in order to provide various additional configurations including larger block size or a greater number of congruence classes. For example, decoder 52 may be provided with an additional one or two control inputs, via input line 36, generated off chip by encode logic block 30 which will allow the transfer of half of the $2^k$ bits provided to decoder 52 such that any one of the first half of these bits may be placed in any of the storage locations in buffer 44. This will effectively increase the associativity of the buffer 44. In a fixed sized buffer utilizing one of the $k$ bits as an additional class address bit reduces the block size to $2^{k-1}$.

The above examples illustrate how a memory hierarchy appearing to a computer system as a conventional fixed configuration may be dynamically varied such that the associativity, block size and number of congruence classes may be varied according to desired system requirements.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system including a first and second memory, wherein data is organized in said first memory in at least one data class and wherein each data class is composed of a number of blocks of data, each containing a plurality of bytes, each of said blocks of data being addressable in response to a first memory block address provided by said system, and wherein data is organized in said second memory in the same number of classes as in said first memory, each of said classes in said second memory composed of a smaller number of blocks of data than in said first memory, each block of data in said second memory being addressable in response to a second memory block address provided, at least partially, by a directory, means responsive to a byte address provided by said system for addressing individual bytes within a block of data in said second memory, means for transferring blocks of data between said first and second memories, and directory means for controlling the transfer of blocks of data and for providing at least a portion of said second memory block address, the improvement comprising:

means for changing the number of classes in which data is organized in said memories, said means altering said portion of said second memory block address provided by said directory to provide accessing of all blocks of data in said second memory.

2. A data processing system set forth in claim 1 wherein said means for changing the number of classes is responsive to an initiallizing input signal provided by said system.

3. The data processing system set forth in claim 1 wherein said means for changing the number of classes increases the number of classes by a factor of $2^n$, where $n$ is an integer greater than zero, by effecting the substitution of n address bits of the addresses provided by said system for n address bits in said second memory block address.

4. The data processing system set forth in claim 3 wherein the $n$ address bits of the addresses provided by said system used to increase the number of classes are a part of said first memory block address.

5. The data processing system set forth in claim 3 wherein the $n$ address bits of the addresses provided by said system used to increase the number of classes are a part of the byte address.

6. A memory hierarchy for a data processing system comprising:

a large memory, a smaller memory, means for transferring blocks of data between said large and smaller memories, and means for selectively changing the number of locations in said small memory to which blocks of data in said large memory may be transferred.

7. The memory hierarchy as set forth in claim 6 wherein said means for selectively changing the number of locations in said small memory to which blocks of data in said large memory may be transferred also changes the size of said blocks.

* * * * *